United States Patent Office 2,983,280
Patented May 9, 1961

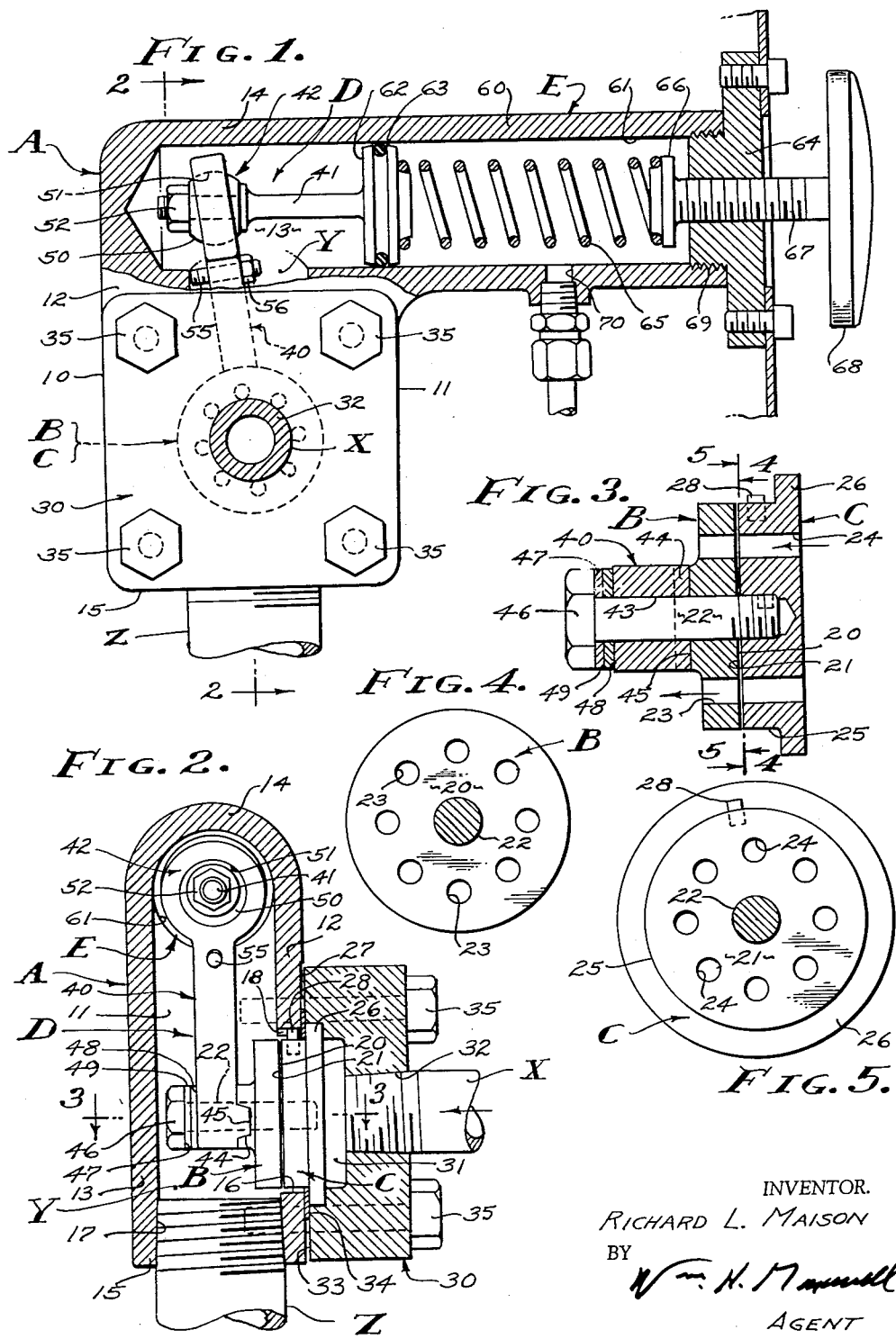

2,983,280

FLUID PRESSURE REGULATING VALVE

Richard L. Maison, Los Angeles, Calif.
(Rte. 1, Box 205, Vashon Island, Wash.)

Filed Dec. 10, 1957, Ser. No. 701,822

7 Claims. (Cl. 137—505.46)

This invention relates to the regulation of fluid under pressure whereby a line pressure is reduced to a constant predetermined pressure, and more particularly to a rotary type valve involving a pressure responsive means for controlling the same, it being a general object of this invention to provide a simple relatively inexpensive valve construction for the above mentioned purpose that is reliable in its operation and which has improved features.

The usual prior art pressure regulating valve is referred to as a "dome type regulator" and which involves a diaphragm responsive to fluid pressure and which operates the valve elements relative to each other. The usual pressure regulating valve is subject to a number of shortcomings, as follows: Because of inertia in the moving parts, the usual valve "overshoots" upon rapid loading of the regulator; Because of inertia and friction in the moving parts, the response time of most valves is not altogether satisfactory; Because of upstream pressure decay, many regulators are subject to "pressure drift"; Because of extreme temperature changes, most all regulators of the type under consideration are adversely affected thereby; Because of design limitations, not all regulating valves have the desired sensitivity range; Because of the usual structural relationship of parts, most valves involve a substantial amount of internal friction, and the result is hammering and vibration; And, generally speaking, most pressure regulating valves are of substantial size and weight, are expensive to manufacture and are also difficult to service.

It is an object of this invention to provide a pressure regulating valve wherein the parts are related so as to minimize if not eliminate "overshooting" caused by rapid pressure loading thereof. In the structure that I provide, as the downstream pressure increases a greater pressure drop per degree of rotation is realized while the pressure responsive means acts at a substantially constant rate. This divergent function prevents said "overshooting" of the valve which would otherwise result in a "hunting" action.

Another object of this invention is to provide a pressure regulating valve wherein the response time thereof compares most favorably with any other valve of said type. Response time is a function of the initial differential pressure as it is related to the internal friction, the inertia of the moving parts, and the degree of movement required, each of these later factors being minimized in the valve of the present invention.

It is another object of this invention to provide a pressure regulating valve wherein regulated pressure drift is minimized. The valve of the instant invention is subjected to control by downstream pressure magnitude with respect to a constant bias, either by spring or by fluid pressure, to the end that here is a minimum of pressure drift.

It is still another object of this invention to provide a pressure regulating valve wherein temperature changes have a minimum effect upon the operativeness of the valve. In the instant valve there is a minimum number of working parts with limited working surfaces, none of which are machined to, so called, critical dimensions.

It is a further object of this invention to provide a pressure regulating valve wherein the desired range of sensitivity is easily obtainable as circumstances require. The valve elements are selectively replaceable, and also is the biasing element, which is manually adjustable.

It is still a further object of this invention to provide a pressure regulating valve of the character thus far referred to that is compact and serviceable, and which is not only reliable under a wide range of operating conditions, but which is also easy to maintain in proper operating condition.

The various objects and features of my invention will be fully understood from the following detailed description of a typical preferred form and application of my invention, throughout which description reference is made to the accompanying drawings, in which:

Fig. 1 is a side elevation of the pressure regulating valve of the present invention with portions thereof broken away to show in section. Fig. 2 is a sectional view taken as indicated by line 2—2 on Fig. 1. Fig. 3 is an enlarged detailed section of a portion of the structure and taken as indicated by line 3—3 on Fig. 2. And, Figs. 4 and 5 are views of the valving elements that I provide being views taken as indicated by lines 4—4 and 5—5 on Fig. 3.

The pressure regulating valve, as shown throughout the drawings, is intended for use in a flow line to control the downstream pressure of fluid, and is not intended to be used as a shut-off valve. As best illustrated in Fig. 1 of the drawings, the valve involves, generally, a case or body A, cooperately related valve elements B and C, operating means D, and pressure responsive means E. The body A has a chamber Y formed therein to receive fluid under pressure from an upstream line X and to deliver fluid to a downstream line Z. The valve elements B and C are shiftably related elements carried by the body A and are provided to control entry of fluid into the chamber Y from the line X. The operating means D is carried by the body A within the chamber Y and operates the valve elements relative to each other, and the pressure responsive means E senses pressure within said chamber and actuates the operating means D to shift the valve elements.

The case or body A that has the chamber Y formed therein is provided to form the frame of the valve structure and receives the working elements thereof, all as hereinafter described. The body A may vary widely in actual construction and is shown in the form of a casting, or the like, having side walls 14 and 15. As indicated, the chamber Y is a closed chamber, and in the particular case illustrated the front wall 12 has an opening 16 therein to receive the valve elements B and C, and the bottom wall 15 has an opening 17 therein to receive the terminal end of the downstream line Z. The opening 16 is preferably a round opening with a keyway 18 in the periphery thereof, while the opening 17 is a threaded opening adapted to be coupled to the line Z.

The valve elements B and C, that are shiftably related elements, are provided to control the flow of fluid under pressure from the upstream line X into the chamber Y. In accordance with the invention, the elements B and C are preferably metal parts related to each other to form a unit of construction, and they are rotatable relative to each other. The said unit of construction formed by the elements B and C is best illustrated in Fig. 3, each of the elements being a disc-shaped element. In the particular case illustrated, the elements B and C have opposed faces 20 and 21 in a plane normal to the axis of the elements, and there is a central pin 22 anchored in one element and rotatably carrying the other element.

Like circular series of ports 23 and 24 are provided to extend axially through the valve elements B and C, respectively. The number and arrangement of ports may vary widely as circumstances require, the total area of the ports when open being equal to or more than the area of the flow line X. In the particular case illustrated, there are eight equally spaced ports 23 in the valve element B and eight equally spaced ports 24 in the valve element C. The ports 23 and 24 are round in cross sectional configuration and register with each other when the valve is fully opened. By rotation of the valve elements relative to each other the ports are opened or closed, this closing function when represented in graph form being a substantially straight line.

In the case illustrated, the valve element C is supported by the body A in the opening 16, the outer diameter 25 of the element C having sliding engagement, or clearance, in the opening 16. A peripheral flange 26 projects radially from the outer diameter 25 to engage with the flat exterior 27 of the front wall 12. In order to locate or rotatively orient the valve element C, a key 28, preferably in the form of a pin, is carried by the element C to project from the outer diameter 25 thereof to engage in the keyway 18. As shown, the central pin 22 is threadedly anchored in the element C and rotatably carries the element B, there being a locking device to prevent turning of the threaded connection once it is properly adjusted, for example a fiber block or pad is carried in the exterior of the pin 22, as indicated, in order to engage the threads in the element C.

In order to retain the element C in working position, and in order to conduct fluid therethrough from the upstream line X, I provide a retainer 30. The retainer 30 is in the form of a cap that overlies the opening 16 and element C and which is adapted to be drawn into sealing engagement with the exterior 27 of the wall 12. A passage 31 extends through the retainer 30 to be in communication with the line X which, in practice is threadedly engaged in an opening 32 in the retainer to deliver fluid under pressure into the passage 31, and the passage 31 delivers fluid to the ports 24. The back side 33 of the retainer is flat and has a recess therein to receive, and center, the flange 26 of the element C, and in order to provide a fluid tight seal between the body A and element C and retainer 30 a gasket 34 is engaged between the exterior 27 and flange 26, said gasket projecting radially outward to seal with the back face 33 of the retainer 30. Suitable screw fasteners 35 are provided to pull the retainer 30 into sealing engagement with the body A, which also secures the element C in working position.

The operating means D that is carried within the chamber Y to operate the valve elements relative to each other is provided to rotate the valve elements B and C relative to each other in response to rectilinear movement of the pressure responsive means E later described. The means D is a lever type means and involves, generally, an operating arm 40 joining the arm and link. The operating arm 40 is carried by or connected to one of the valve elements B or C. In the case under consideration, the arm 40 is connected to the element B to rotate the same when the arm 40 is shifted by the link 41. It is preferred that the arm 40 be made separately from the element B in which case the inner end portion of the arm has a bearing opening 43 passing therethrough so that the arm 40 can be rotatably carried on the pin 22. Driving connection between the arm 40 and the element B is provided and the arm 40 is keyed to the element B. As shown, a diametrically disposed key 44 projects from the inner end portion of the arm and engages in a keyway 45 formed in the element B. The key 44 and keyway 45 are tapered or wedge shaped in order to eliminate any play or motion between the parts (as shown).

A feature of construction is the manner in which the arm 40 and elements B and C are retained in working position relative to each other. As best illustrated in Fig. 3, there is a head 46 at the terminal end of the pin 22, said head having a thrust face 47 opposing the outer side 48 of the arm 40. Antifriction thrust washer 49 is interposed between the face 47 and side 48, said face, side and washer being of relatively small diameter, as shown. In practice, washer 49 of "Teflon" or tetrafluoroethylene is employed for antifriction properties, to the end that the arm 40 and element B is free to be easily rotated relative to the element C.

The arm 40 projects radially from the pin 22 and the coupling 42 is at the outer end portion of the arm. The link 41 is a straight elongate part on an axis tangentially disposed to the arc of swing of the end portion of the arm 40, and is, therefore, laterally removed or offset from the axis of rotation of the valve elements B and C. The coupling 42 that joins the link 41 to the outer portion of the arm 40 is a pivot type construction and is preferably a universal joint and involves, generally, a ball 50 engaged in a socket 51. The ball 50 is secured to the end of the link 41 while the socket 51 is at the outer end of the arm 40. The ball 50 is flattened at diametrically opposite sides and the socket is of a flat ring shape, and includes features so that the coupling parts can be assembled in the usual manner. As shown, the ball is secured against a shoulder on the link 41 by means of a nut 52 threaded onto the terminal end of the link.

In order to limit travel or swing of the arm 40, an adjustable stop 55 is provided. The stop 55 is preferably in the form of an adjustable screw extending through the arm 40 in the direction of travel thereof and adapted to strike against opposite sides of the body A within the chamber Y. When the stop 55 is properly set, or centered, a lock nut 56 is tightened thereon to hold it in position.

The pressure responsive means E, that senses pressure within the chamber Y and actuates the operating means D, is provided to reciprocate the link 41 to swing the arm 40 in order to rotate the valve elements B and C relative to each other. The means E may be varied, that is, it may be a pressure responsive diaphragm means, or a pressure responsive bellows means, or a cylinder and piston means as shown. In any case, the means E is located on the axis, or normal axis, of the link 41 and when the arm 40 projects upward, as shown, the means E is located at one side of the body A and at the top 14 thereof. In the case under consideration, when the means E is a cylinder and piston means, the said means is housed in an extension of the body A that projects laterally of one side of the body. In Fig. 1 of the drawings, I have shown a cylindrical extension 60 having a bore 61 concentric with the normal axis of the link 41. A piston 62 is operable longitudinally of the bore 61, said piston being carried by the outer end of the link 41. In carrying out the invention the piston 62 is either made smaller in diameter than the bore 61 or it is made with a spherical periphery so that the axis thereof can be angularly related to the axis of the bore, during operation, without binding of the piston in the bore. Further, the seal 63, for example an O ring seal, is provided at the periphery of the piston to engage the bore 61.

The pressure responsive means E includes a bias that yieldingly urges the above described working parts to open the ports 23 and 24. As shown, the bias may be in the form of a spring 65 compressed against the piston 62, and an adjustable spring seat 66 carried by the head 64 of the extension 60. The head 64 is joined to the extension 60 as by a threaded connection 69 and a threaded stem 67 under control of a manually rotatable knob 68 adjustably positions the seat 66. An opening 70 is provided in the head end of the cylindrical extension 60 and may be used to vent the bore 61, or it may be used to pressurize the cylinder and piston unit thereby providing a bias. Said fluid pressure bias may be employed in lieu of the mechanical means illustrated, in which case the head 64 is simply closed.

With the pressure regulating valve structure hereinabove described, and as illustrated in the drawings, a very satisfactory and commercially practical device is provided for regulating of fluid pressure from a high pressure to a lower pressure, or any like situation. The valve is normally open, in which case the fluid flows therethrough with little or no pressure drop at the ports 23 and 24. As excess pressure develops in the chamber Y the piston 62 is moved against the bias allowing the ports 23 and 24 to close, and as the ports close the pressure drop increases at the ports 23 and 24. Therefore, as the downstream pressure increases, rotation of the valve elements create a greater pressure drop per degree of movement while the bias operates at a substantially constant rate, all in order to prevent "overshooting" and "hunting."

As the valve ports 23 and 24 are closed, pressure is applied to the valve element B and the anti-friction washers 49. Note that the valve elements are not pressed together by fluid pressure applied, or by mechanical pressure, to the end that they are always free to rotate. In carrying out the invention, the head 46 is adjusted so that the opposed faces 20 and 21 of the valve elements B and C are juxtapositioned but not actually touching, and if desired a lubricant is interposed between said faces.

It will be apparent that the valve hereinabove described is easily manufactured and that it operates smoothly and without undue friction and wtihout vibration or hammering. The valve elements operate to control the pressure of fluid in the downstream line Z without actually coming together and with the result that the valve can never become jambed or injured from excess loads whether they are constant or shock loads.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A fluid pressure regulating valve of the character described and including, a body with a chamber formed therein and having an inlet to receive fluid under pressure from an upstream line and having an outlet to deliver it to a downstream line, a pair of disc-shaped valve elements for controlling entry of fluid into the chamber from the upstream line, one of said valve elements being fixed and opposed to the inlet fluid pressure, and the other of said valve elements being rotatably carried by a pin at the side of the fixed element that is faced away from said inlet fluid pressure, operating means to turn the rotatable valve element relative to the fixed valve element, and a pressure responsive means to sense the outlet fluid pressure within said chamber and actuating the operating means to turn the rotatable valve element toward a closed position.

2. A fluid pressure regulating valve of the character described and including, a body with a chamber formed therein and having an inlet to receive fluid under pressure from an upstream line and having an outlet to deliver it to a downstream line, a valve element fixedly engaged in said opening and opposed to the inlet fluid pressure, a second valve element rotatably carried by a pin projecting from the fixed element at the side thereof faced away from said inlet fluid pressure, said valve elements being opposed and in spaced relationship relative to each other and controlling entry of fluid into the chamber through the inlet, operating means turn the rotatable valve element relative to the fixed valve element, and a pressure responsive means to sense the outlet fluid pressure within said chamber and actuating the operating means to turn the rotatable valve element toward a closed position.

3. A fluid pressure regulating valve of the character described and including, a body with a chamber formed therein and having an inlet and an opening to receive fluid under pressure from an upstream line and having an outlet to deliver it to a downstream line, a valve unit engaged in said opening to control entry of fluid into the chamber from the inlet and including a valve element fixedly positioned in said opening and opposed to the inlet fluid pressure, a second valve element rotatably carried by a pin projecting from the fixed element at the side thereof faced away from said inlet fluid pressure, said valve elements being opposed and in spaced relationship relative to each other, operating means to turn the rotatable valve element relative to the fixed valve element, and a pressure responsive means to sense the outlet fluid pressure within said chamber and actuating the operating means to turn the rotatable valve element toward a closed position.

4. A fluid pressure regulating valve of the character described and including, a body with a chamber formed therein and having an inlet and an opening to receive fluid under pressure from an upstream line and having an outlet to deliver it to a downstream line, a valve unit engaged in said opening to control entry of fluid into the chamber from the inlet and including a disc-shaped valve element fixedly positioned in and closing said opening and opposed to the inlet pressure, a second valve element rotatably carried by a pin projecting from the fixed element at the side thereof faced away from said inlet fluid pressure, said valve elements being in spaced relationship and having registerable ports adapted to be moved out of register, operating means to turn the rotatable valve element relative to the fixed element, and a pressure responsive means to sense the outlet fluid pressure within said chamber and actuating the operating means to turn the rotatable valve element toward a position where said ports are out of register.

5. A fluid pressure regulating valve of the character described and including, a body with a chamber formed therein and having an inlet and an opening to receive fluid under pressure from an upstream line and having an outlet to deliver it to a downstream line, a valve unit engaged in said opening to control entry of fluid into the chamber from the inlet and including a valve element fixedly positioned in and closing said opening to oppose the inlet fluid pressure, and a second valve element within the chamber and rotatably carried by a pin projecting from the side of the fixed element faced away from said inlet fluid pressure, said valve elements being opposed in spaced relationship relative to each other and having registerable ports adapted to be moved out of register, operating means including an arm projecting radially from the rotatable valve element and a link engaged with the outer end of the arm, and a pressure responsive means to sense the outlet fluid pressure within said chamber and actuating the link to turn the rotatable valve element relative to the fixed valve element to close said ports.

6. A fluid pressure regulating valve of the character described and including, a body with a chamber formed therein and having an inlet and an opening to receive fluid under pressure from an upstream line and having an outlet to deliver it to a downstream line, a valve unit engaged in said opening to control entry of fluid into the chamber from the inlet and including a valve element fixedly positioned in and closing said opening to oppose to the inlet fluid pressure, and a second valve element within the chamber and rotatably carried by a pin projecting from the side of the fixed element faced away from said inlet fluid pressure, said valve elements being opposed in spaced relationship relative to each other and having registerable ports adapted to be moved out of register, operating means to turn the rotatable valve element relative to the fixed valve element, and a pressure responsive means to sense the outlet fluid pressure within said chamber and including a reciprocable element biased in one direction and urged by the outlet fluid pressure in the other direction to turn the rotatable valve element relative to the fixed valve element to close said ports.

7. A fluid pressure regulating valve of the character described and including, a body with a chamber formed therein and having an inlet and an opening to receive fluid under pressure from an upstream line and having an outlet to deliver it to a downstream line, a valve unit engaged in said opening to control entry of fluid into the chamber from the inlet and including a disc-shaped valve element fixedly positioned in and closing said opening to oppose the inlet fluid pressure, and a second disc-shaped valve element opposing the first mentioned fixed valve element and rotatably carried by a pin projecting from the side of the fixed element faced away from said inlet fluid pressure, said valve elements being in spaced relationship and having registerable ports adapted to be moved out of register, operating means including an arm keyed to and projecting radially from the rotatable valve element and a link universally engaged with the outer end of the arm, and a pressure responsive means to sense the outlet fluid pressure within said chamber and including a cylinder and a piston operable to reciprocate therein, said piston being biased in one direction and urged by the outlet fluid pressure in the other direction and to turn the rotatable valve element relative to the fixed valve element to close said ports.

References Cited in the file of this patent

UNITED STATES PATENTS

| | | |
|---|---|---|
| 530,765 | Gaskill | Dec. 11, 1894 |
| 862,867 | Eggleston | Aug. 6, 1907 |
| 1,213,463 | Dalen | Jan. 23, 1917 |
| 1,452,252 | Muller | Apr. 17, 1923 |
| 1,885,000 | Muller | Oct. 25, 1932 |
| 1,948,840 | Biddle | Feb. 27, 1934 |
| 2,241,537 | Buboltz | May 13, 1941 |

FOREIGN PATENTS

| | | |
|---|---|---|
| 62,860 | Germany | June 25, 1892 |